Figure 1:
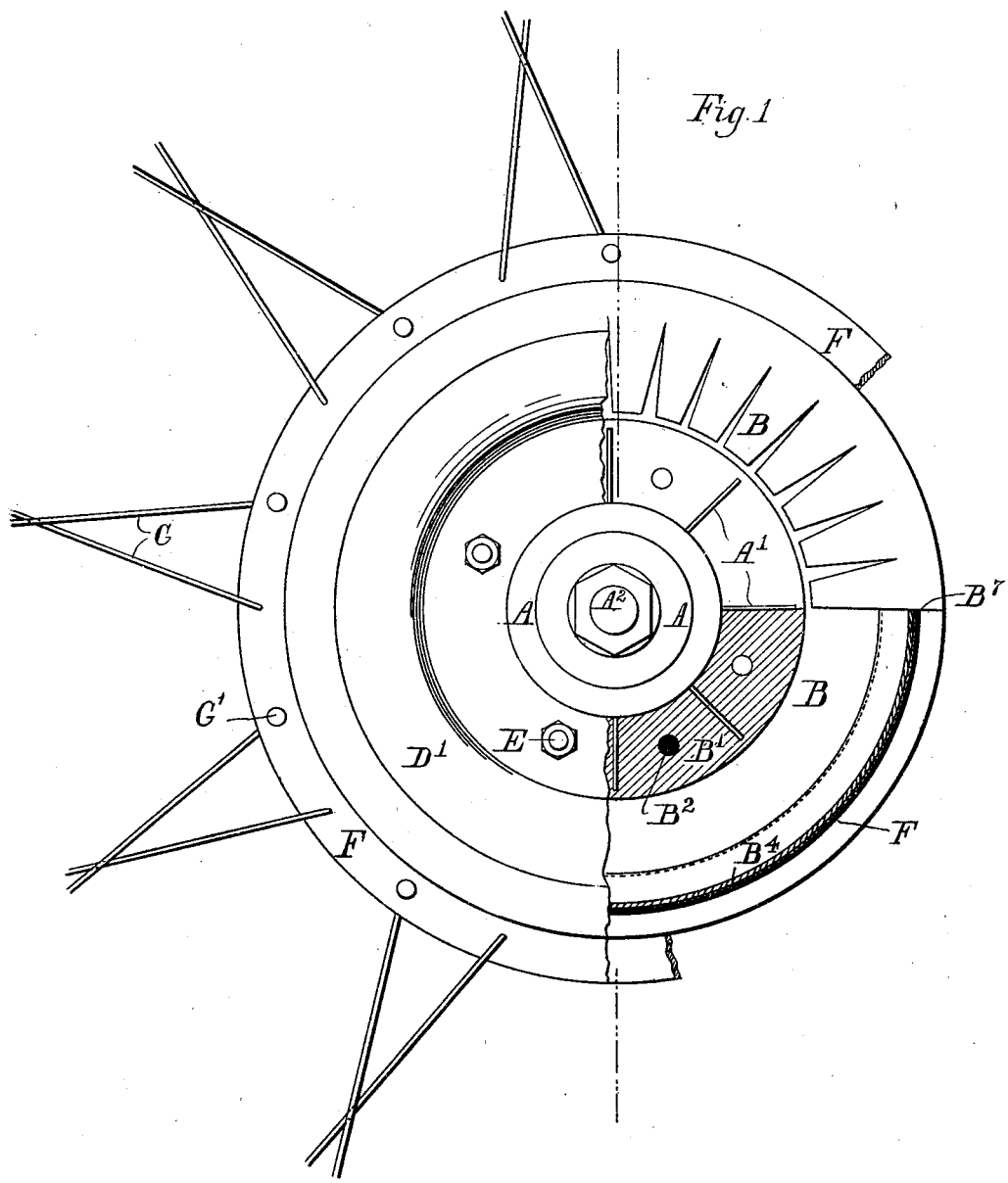

(No Model.)  2 Sheets—Sheet 1.
W. A. KÖNEMAN.
WHEEL HAVING PNEUMATIC HUB.

No. 599,907. Patented Mar. 1, 1898.

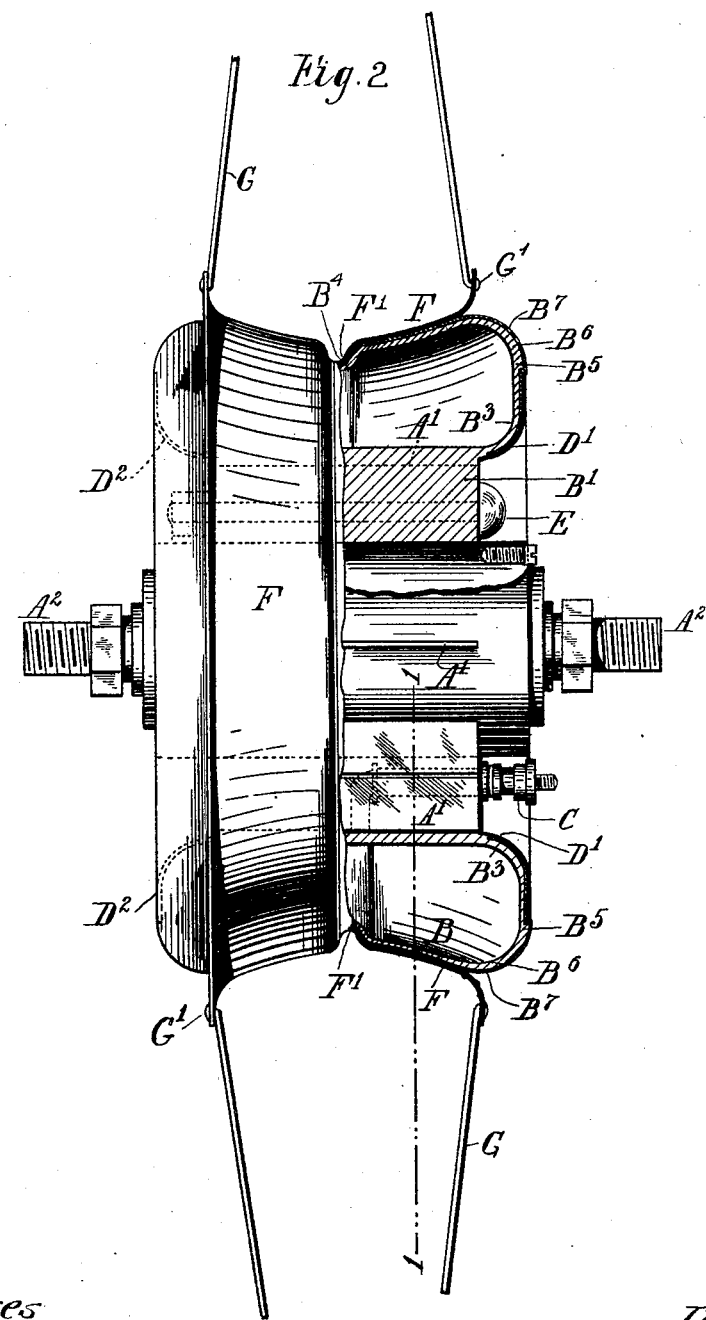

UNITED STATES PATENT OFFICE.

WILLIAM ADOLPH KÖNEMAN, OF LONDON, ENGLAND, ASSIGNOR TO CARL KÖNEMANN, OF COLOGNE-EHRENFELD, GERMANY.

WHEEL HAVING PNEUMATIC HUB.

SPECIFICATION forming part of Letters Patent No. 599,907, dated March 1, 1898.

Application filed June 30, 1897. Serial No. 642,998. (No model.)

*To all whom it may concern:*

Be it known that I, WILLIAM ADOLPH KÖNEMAN, a citizen of the United States, residing at London, England, have invented certain new and useful Improvements in Pneumatic Hubs for Wheels, of which the following is a specification.

This invention relates to wheels, particularly vehicle-wheels provided with what is known as the "pneumatic hub."

In the accompanying drawings, which illustrate by way of example one construction of pneumatic hub according to this invention, Figure 1 is a view half in elevation, the other half being partly in elevation with a side flange removed and partly in section on the line 1 1 of Fig. 2; and Fig. 2 is a view at right angles to Fig. 1, half in elevation and half in vertical central section.

Like letters indicate like parts throughout the drawings.

A is the central portion of the hub, which in the present example consists of a cylindrical barrel, in which the axle $A^2$ runs in oil and which contains the ball-bearings of the axle. On the external surface of the part A are formed a number of radially-projecting feathers or webs $A'$.

B is the annular air-chamber. On the inner periphery of the chamber is formed a solid rubber core $B'$, which is slid on the barrel A, the core being grooved, so that it will be engaged by the feathers in the manner indicated in Fig. 1.

C is the air-valve, fixed on the core $B'$ and communicating with the interior of the air-chamber B by the hole $B^2$, Fig. 1, piercing the core.

Side flanges $D'$ $D^2$, which encircle the hub and bear against the opposite ends of the feathers $A'$, bear also against the sides $B^3$ of the chamber B, as shown. Bolts E, which pass through the side flanges $D'$ $D^2$ and through the rubber core $B'$, hold them in place on the hub.

The air-chamber B is encircled by a ring F, having a concave exterior, and a central annular projection $F'$ on its interior, embracing the rubber air-chamber, which is centrally grooved at $B^4$ to receive the projection $F'$, as will be clearly seen from Fig. 2. By the engagement of this central projection $F'$ of the ring F with the corresponding groove $B^4$ in the air-chamber they are prevented from having any lateral displacement relatively to each other. The diameter of the side flanges $D'$ $D^2$ is such that they confine the air-chamber sufficiently to prevent it from having lateral movement on the hub and keep the plane of the wheel always perpendicular to the axis of rotation, or approximately so; but they do not injuriously affect the free movement of the outer circumferential portion of the air-chamber radially in compression or expansion. This outer circumferential portion may be considered as begirning (in section) at the circumferential edge of one flange $D'$ and extending as an elastic arch across to the corresponding edge of the other flange $D^2$. Moreover, the chamber B when inflated will not rotate within the ring F on account of the friction between them, resulting from the pressure with which the air in the chamber keeps the outside of the chamber against the inside of the ring. The spokes G are passed through the flanged edges of the ring F and retained therein by their rivet-heads $G'$.

Preferably the inflatable chamber B is provided with thickened side walls $B^3$, having annular projections $B^5$, one at each side, to overlap or rest upon the outer edges of the side flanges $D'$ $D^2$. By this construction it follows that when in the use of the hub a part of the ring F moves toward the barrel A the side walls $B^3$ of the air-chamber, upon which the projections $B^5$ are formed, are upheld and cannot be forced inward between the flanges $D'$ $D^2$ in such wise as to tend to exert a wedging action thereon. Unless this wedging tendency were prevented the chamber would be liable to become jammed between the flanges and the resilience of the device would be impaired. Such resilience is mainly obtained from the curved free parts $B^6$ of the air-chamber.

$B^7$ is a canvas coating for the air-chamber B. The canvas might be otherwise combined therewith—as, for instance, by lining the chamber with canvas.

If required, positive means may be employed to prevent any slip between the ring F and inflated chamber B, but usually it is preferred not to use them.

The spokes in the rim may be of any ordinary and suitable construction and may be arranged in any convenient manner. The tire or road-surface may be of any suitable description, preferably pneumatic or cushioned.

I claim—

1. In a pneumatic hub, the combination of a rigid central portion, a resilient core surrounding said central portion, an inflatable chamber surrounding said core, and a rigid ring surrounding said chamber and having an internal annular projection circumferentially indenting the exterior surface of the chamber-wall, substantially as and for the purpose set forth.

2. In a pneumatic hub, the combination with the inflatable chamber B having the circumferential groove $B^4$, of a ring F surrounding said chamber and having an inner annular projection F' entering said groove, substantially as and for the purpose set forth.

3. In a pneumatic hub, the combination of a core surrounding a central portion provided with one or more projections A' engaging said core, an inflatable chamber provided with projections $B^5$, and flanges D' and $D^2$ upon said chamber engaging said projections A' and $B^5$, substantially as described.

4. In a pneumatic hub, the combination of a rigid central portion, a resilient core surrounding said central portion, an inflatable chamber surrounding said core, and a rigid ring surrounding said chamber and having an internal annular projection at which it engages with the exterior wall of said chamber, said ring having flanges at which to attach the spokes, substantially as described.

5. A pneumatic hub comprising, in combination, the central portion A having projections A', the core B' engaged by said projections, the inflatable reinforced chamber surrounding said core and provided with projections $B^5$, flanges D' and $D^2$ upholding the sides $B^3$ of said chamber and a flanged ring F surrounding and engaging circumferentially with said chamber, substantially as described.

In testimony whereof I have hereto set my hand in the presence of two subscribing witnesses.

WILLIAM ADOLPH KÖNEMAN.

Witnesses:
 ALFRED J. BOULT,
 HARRY B. BRIDGE.